UNITED STATES PATENT OFFICE.

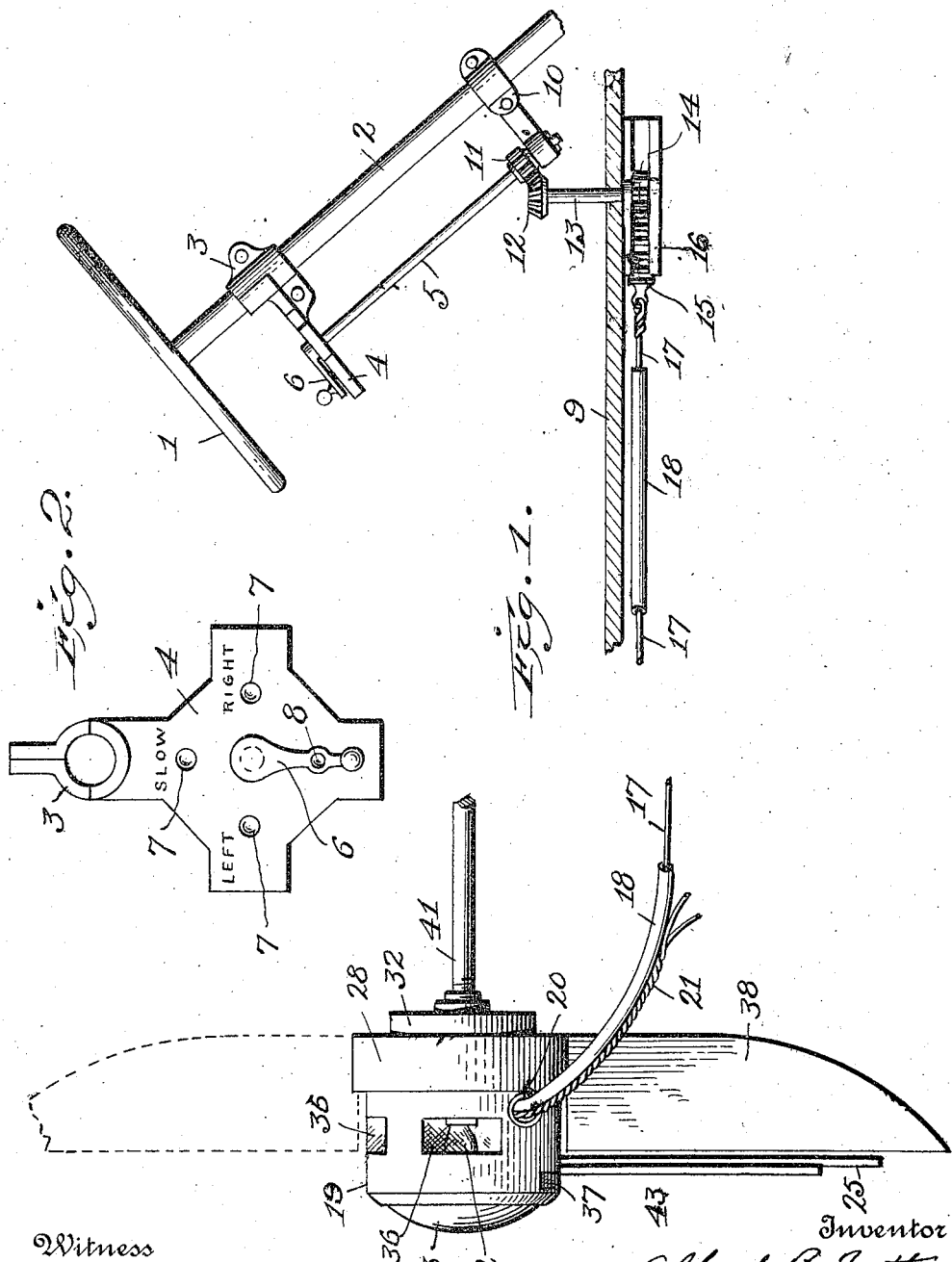

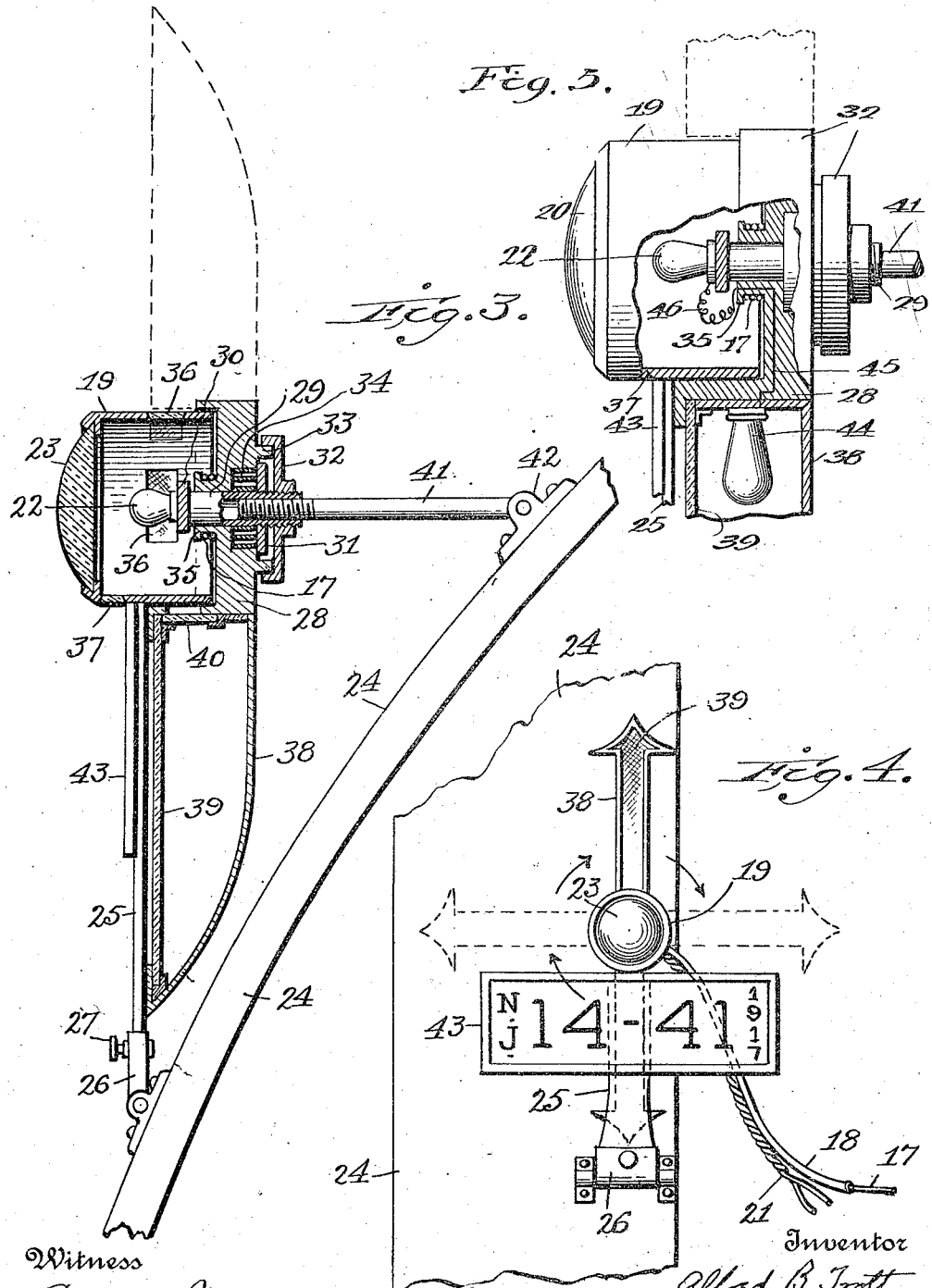

ALFRED B. TROTT, OF DENVER, COLORADO.

AUTOMOBILE TRAFFIC-SIGNAL.

1,244,259.  Specification of Letters Patent.  Patented Oct. 23, 1917.

Application filed February 19, 1917. Serial No. 149,592.

*To all whom it may concern:*

Be it known that I, ALFRED B. TROTT, a citizen of the United States, residing in Denver, county of Denver, State of Colorado, have invented certain new and useful Improvements in Automobile Traffic-Signals; and I do hereby declare the following to be a full, clear, and exact description of the invention, such as will enable others skilled in the art to which it appertains to make and use the same.

My invention relates to automobile traffic signals, adapted to be located preferably at the rear of the car, and has for its main objects, first, to mount an indicating arm or semaphore pivotally upon the electric tail-light casing in such manner that it will be illuminated by said tail-light at night; and, secondly, to provide improved means for operating said semaphore from the steering wheel of the car. My invention also contemplates certain minor detailed and simplified novel features in the various parts, as hereinafter more definitely will be pointed out and claimed, reference being had to the accompanying drawings, in which:—

Figure 1 is a side elevation of my improved device and its operating mechanism, showing the latter mounted with respect to an automobile steering wheel.

Fig. 2 is a face view of the control dial plate and its clip.

Fig. 3 is a central vertical sectional view of the signal, the same being shown mounted on the rear of the automobile fender.

Fig. 4 is a face view of said signal.

Fig. 5 is an enlarged side elevation of the tail-light casing and the semaphore associated therewith, the parts being partly broken away and showing a slightly modified construction.

Similar numerals of reference denote corresponding parts in the several views.

In the said drawing the reference numeral 1 denotes the usual steering wheel of an automobile, to the steering post 2 of which is fixed detachably, by means of the clip 3, a control dial plate 4, the same preferably being formed integral with said clip, as shown. Passed through said dial plate is a shaft 5 disposed parallel with the steering post 2, and having fixed at its upper end a handle 6, which serves both as an actuating means for said shaft 5 and as a pointer, as hereinafter described. Said dial plate is marked at three points with the words "left" "slow" and "right", and at each of said points the dial plate is formed with a depression 7, with which a stop 8 engages as the handle 6 is rotated, said handle being slightly resilient for this purpose, and said engagement being sufficient to retain said handle against any but a positive manual shift. The lower end of the shaft 5 which terminates above the floor 9 of the car, and is supported by a bracket clip 10 attached to the steering post 2, is provided with a bevel gear 11 meshing with a similar bevel gear 12 at the upper end of a shaft 13 which passes through and is supported in the car floor 9, as shown, and which has mounted at its lower end a pinion 14, in engagement with a rack 15 mounted to slide in suitable guides 16 fixed to the underside of the car floor 9. Extending from the rear end of said rack 15 is a wire 17, preferably piano wire, which is received and guided by a flexible sheath 18 through which it is led to the rear of the car where they are together carried into the casing 19 of the automobile electric tail-light through an opening 20 therein, which also receives the usual wires 21 which furnish the current to its lamp 22.

The tail-light casing 19 is provided with the usual rear red glass 23, and is mounted on the rear fender 24 of the car preferably by a comparatively broad flat bracket plate 25, which at its lower end is received in a socket 26 pivoted on the fender 24 and is retained therein by a set screw 27. Disposed at the rear open end of the tail-light casing 19 is a block 28, the same being mounted rotatably on a hollow stub-shaft 29 that is fixed to a cross-bar 30 in said casing 19. Said block is retained in position by a nut 31 screwed onto the stub-shaft 29, and there is also screwed to said stub-shaft a dust-guard 32 which fits over an annular flange 33 formed on the block 28. Said block is hollowed centrally at its rear to form a chamber to receive a coiled spring 34, fastened at one end to said block and at its other end to said stub-shaft 29, and also is formed at its front into a hub 35 adapted to have fixed to and wound thereon the rear end of the wire 17 leading from the rack 15, hereinbefore described. The casing 19 is provided in its sides and top with apertures 36 closed by glass, and in its bottom with an additional glass-closed aperture 37, all for purposes hereinafter to be described. Fixed on the hub 28 is a semaphore arm 38, the same being formed of metal and hollow, and being apertured in its front face to receive a glass 39, and also being apertured and glass closed at 40, for a purpose hereinafter to be described. In order better to support the device as a whole I form the stub-shaft 29 hollow and interiorly screw-threaded to receive a bar 41, which is connected to a bracket 42 fixed on the fender 24 and which forms a brace for said tail-light and its parts. Fixed to the bracket 25 immediately below the tail-light casing 19 is the usual license number plate 43 which is illuminated constantly by the lamp 22 shining through the aperture 37 thereon.

The operation of my improved device is as follows:—The normal position of the semaphore arm 38 is that shown in Fig. 3 of the drawing, which is its lowermost position concealed behind the bracket-plate 25 which supports the tail-light casing 19. In this position the tail-light lamp 22 shines through the glass 37 and thus illuminates the usual license number-plate 43 supported on the bracket-plate 25. Now when the operator desires to indicate, say, that he is about to turn to the left, he manipulates the handle 6 through 90°, to bring it to a horizontal position engaging the depression 7 at the left, thereby, through shaft 5, pivotal gears 11, 12, shaft 13, pinion 14 and rack 15, drawing on the wire 17, which in turn, through its connection with the hub 35 of the block 28, causes said block to be rotated a corresponding distance, thereby raising the semaphore 38 to the dotted position at the left, shown in Fig. 4, and thereby indicating that it is the intention of the driver to turn to the left. The handle 6 will, through the engagement of its spring-pressed stop 8 with the depression 7, retain the parts in this position until manually shifted, and when the return of said handle to its normal position is effected, the operation of the parts will be reversed and the wire 17 moved in the opposite direction, due to the fact that the coiled spring 34 will rotate the block 28 and the semaphore to its normal lowermost position, thereby rewinding said wire upon the hub 35. If it should be desired to indicate that the car is to be slowed down or stopped, the handle 6 is rotated through 180°, to the vertical position indicated by the word "slow" on the dial 4, which correspondingly will rotate the hub 28 and the semaphore 38, so that the latter will assume the vertical dotted line position of Fig. 3 or the full line position of Fig. 4. Also, when it is desired to indicate that the car is to turn to the right, the handle 6 is rotated through 270°, to the position indicated by the word "right," which will turn the hub 28 and semaphore 38 to the dotted line position at the right in Fig. 4. Due to the fact that the casing 19 of the tail-light is provided with the glass closed apertures 36 in its sides and top, and the semaphore is provided with a glass closed aperture 40, registering with said apertures 36, the said semaphore will be illuminated by the tail-light globe 22 when in either the right or left-hand dotted position shown in Fig. 4 or in the vertical position shown in full lines in Fig. 4, and in dotted lines in Fig. 3, and, further, the interior wall of the semaphore 38 being made of metal may be polished or otherwise treated to form a high reflecting surface, thereby materially increasing the intensity of the light projected through the glass front 39 of said semaphore.

It will be observed in Fig. 4 that I have disposed the tail-light at the right edge of the fender 24, said fender being the left-hand fender of the car, and this disposition is made for the purpose of preventing the semaphore 38, when projected horizontally to the left, from projecting beyond the edge of said fender, thereby minimizing the danger of its being broken off accidentally. It will be observed, further, that the maximum movement of the semaphore 38 is through an arc of 270°, as indicated by the dotted line position to the right in Fig. 4, so that said semaphore is not adapted nor capable of completing a full revolution. This permits the lighting cable 21, as well as the sheath 18 containing the operating wire 17, to be passed into the tail-light casing 19 without in any way interfering with the operation of the device as a whole.

In Fig. 5 I have shown a slightly modified construction, wherein the lamp 22 is not depended upon to illuminate the semaphore 38, the latter being lighted by a separate lamp 44, fixed in said semaphore, as shown, and being connected in series with the circuit of the lamp 22 by means of a wire 45, passing through the block 28, said wire being extended into a loose coil 46 within the casing 19 to permit the rotation of the semaphore 38 to its various positions. It will be understood that the circuit to lamp 44 may be broken automatically when the semaphore 38 is in its inactive position.

Having thus described my invention, what I claim as new and desire to secure by Letters Patent, is:—

1. A traffic signal for automobiles, comprising a tail-light casing, light apertures disposed radially therein; a hollow semaphore mounted to rotate concentrically with said casing and having a light aperture therein adapted to register with said casing light apertures when said semaphore is rotated, and means for rotating said semaphore.

2. A traffic signal for automobiles, comprising a tail-light casing, a block mounted to rotate concentric with said casing, a hollow semaphore carried by said block and mounted to rotate in alinement with the side wall of said casing, said casing having light apertures therein adapted successively to register with a light aperture in said semaphore whereby the interior of the latter will be illuminated, and means for rotating said semaphore.

In testimony whereof, I have hereunto set my hand this 17th day of February, 1917.

ALFRED B. TROTT.